(12) United States Patent
Speronati Laghi et al.

(10) Patent No.: US 9,671,062 B2
(45) Date of Patent: Jun. 6, 2017

(54) ADJUSTING GROUP

(71) Applicant: TECHNOGYM S.p.A., Gambettola (FC) (IT)

(72) Inventors: Silvio Speronati Laghi, Forlì (IT); Daniele Cei, Cesenatico (IT)

(73) Assignee: TECHNOGYM S.P.A., Gambettola (FC) (IT)

( * ) Notice: Subject to any disclaimer, the term of this patent is extended or adjusted under 35 U.S.C. 154(b) by 0 days.

(21) Appl. No.: 14/850,299

(22) Filed: Sep. 10, 2015

(65) Prior Publication Data

US 2016/0076694 A1    Mar. 17, 2016

(30) Foreign Application Priority Data

Sep. 12, 2014  (IT) .............................. RA2014A0016

(51) Int. Cl.
| A63B 22/00 | (2006.01) |
| F16M 13/02 | (2006.01) |
| A63B 22/06 | (2006.01) |

(52) U.S. Cl.
CPC ......... *F16M 13/02* (2013.01); *A63B 22/0046* (2013.01); *A63B 22/06* (2013.01);
(Continued)

(58) Field of Classification Search
CPC .............. A63B 22/0605; A63B 21/225; A63B 2225/09; A63B 2225/093; A63B 21/015; A63B 2022/0652; A63B 22/0046; A63B 22/0664; A63B 23/0476; A63B 2022/0658; A63B 22/0015; A63B 21/00069; A63B 2208/0233; A63B 69/16; A63B 22/0023; A63B 2210/50; A63B 22/0005;
(Continued)

(56) References Cited

U.S. PATENT DOCUMENTS

| 4,772,069 A | 9/1988 | Szymski |
| 4,807,856 A * | 2/1989 | Teckenbrock ......... B62K 19/36 |
| | | 188/67 |

(Continued)

FOREIGN PATENT DOCUMENTS

GB     1402121      8/1975

OTHER PUBLICATIONS

The search report dated May 21, 2015 issued by the Italian Patent and Trademark Office regarding IT application No. RA2014A000016 filed on Sep. 12, 2014.

*Primary Examiner* — Andrew S Lo
(74) *Attorney, Agent, or Firm* — Abelman, Frayne & Schwab

(57) ABSTRACT

Adjusting group (1) for adjusting the position of a user-interface (2) of a gymnastic machine (100) relative to a respective frame (102) thereof; a sliding coupling unit (120) being associated with the user-interface (2) to define a first path (L) for adjusting the position of the user-interface (2) with respect to the frame (102); a blocking device (130) being provided in combination with the coupling unit (120) to fix the user-interface (2) in any position along the first path (L); the coupling unit (120) comprising a guide (122) associated with the frame (102) and a slide (124) associated with the user-interface (2) and coupled to the guide (122) in a sliding fashion along respective first coupling surface (1220) and second coupling surface (1240).

10 Claims, 5 Drawing Sheets

(52) U.S. Cl.
CPC ...... *A63B 22/0605* (2013.01); *A63B 2225/09* (2013.01); *A63B 2225/093* (2013.01); *F16M 2200/025* (2013.01)

(58) Field of Classification Search
CPC .. F16M 13/022; F16M 11/041; F16M 11/048; F16M 2200/025
USPC .......................................... 482/57; 248/218.4
See application file for complete search history.

(56) References Cited

U.S. PATENT DOCUMENTS

| | | | | |
|---|---|---|---|---|
| 5,649,558 | A * | 7/1997 | Richard | A61H 3/00 135/67 |
| 6,036,214 | A * | 3/2000 | Ono | B62H 1/02 280/288.4 |
| 6,752,453 | B1 | 6/2004 | Yapp | |
| 7,762,931 | B2 * | 7/2010 | Fisher | B62J 1/08 297/215.14 |
| 2007/0215781 | A1 * | 9/2007 | Watt | A63B 22/0046 248/622 |
| 2008/0096725 | A1 * | 4/2008 | Keiser | A63B 21/0051 482/8 |
| 2008/0238160 | A1 * | 10/2008 | Huyck | A63B 22/0605 297/195.11 |
| 2008/0238161 | A1 * | 10/2008 | Huyck | A63B 22/0605 297/215.13 |
| 2009/0170667 | A1 * | 7/2009 | Irving | A63B 23/0476 482/57 |
| 2009/0227429 | A1 * | 9/2009 | Baudhuin | A63B 71/0622 482/57 |
| 2010/0080650 | A1 * | 4/2010 | Gorza | B62J 1/08 403/374.5 |
| 2010/0234185 | A1 * | 9/2010 | Watt | A63B 21/0051 482/8 |
| 2011/0204201 | A1 * | 8/2011 | Kodama | B62J 1/08 248/406.1 |
| 2012/0277066 | A1 * | 11/2012 | Hsu | A63B 22/001 482/57 |
| 2014/0112703 | A1 * | 4/2014 | Chen | B62J 1/08 403/109.2 |
| 2014/0148312 | A1 * | 5/2014 | Lo | A63B 22/0605 482/57 |
| 2014/0158843 | A1 | 6/2014 | Murray | |
| 2015/0045190 | A1 * | 2/2015 | Keiser | A63B 21/0051 482/57 |
| 2015/0238808 | A1 * | 8/2015 | Lin | A63B 22/0605 482/57 |

* cited by examiner

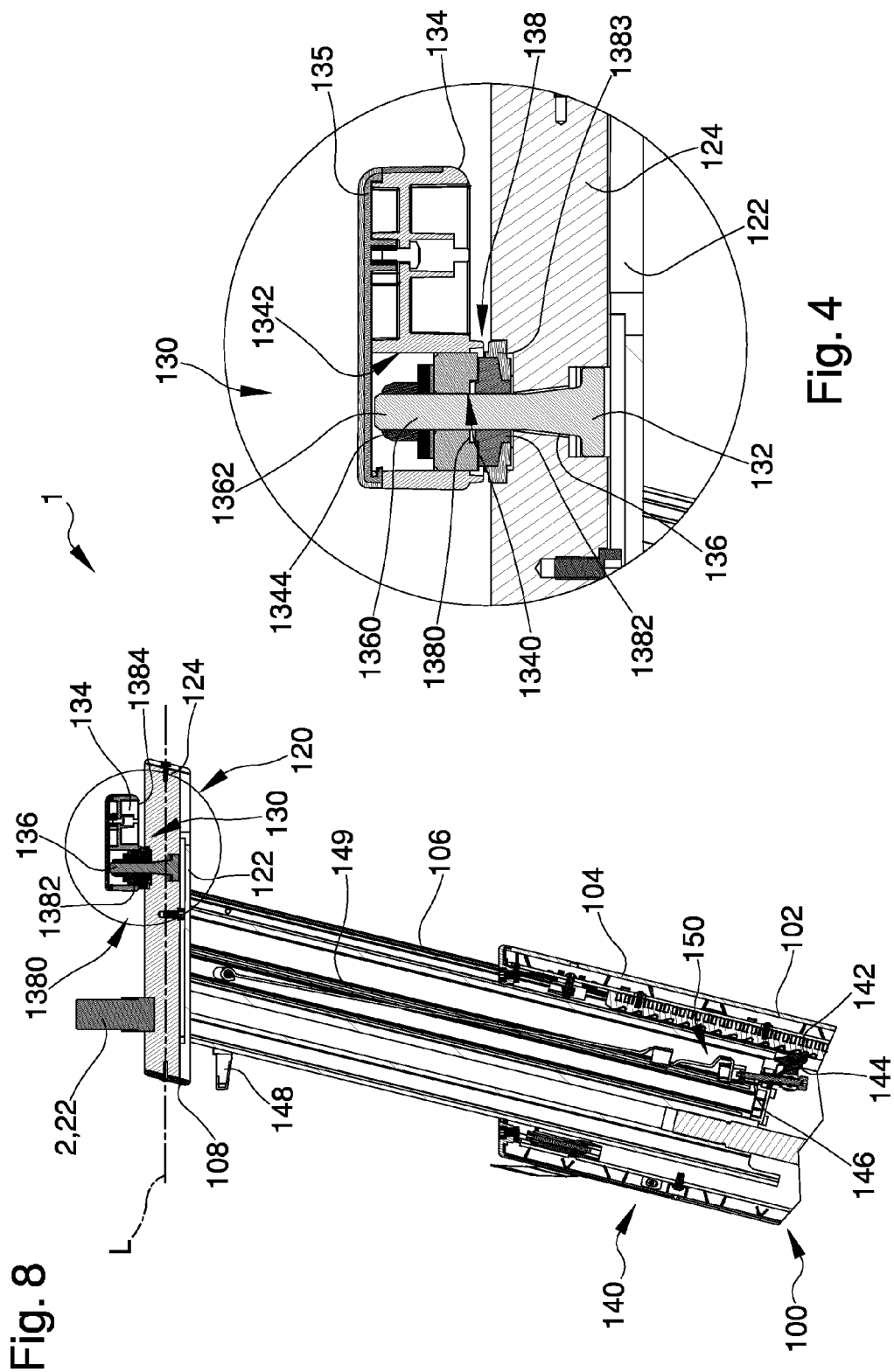

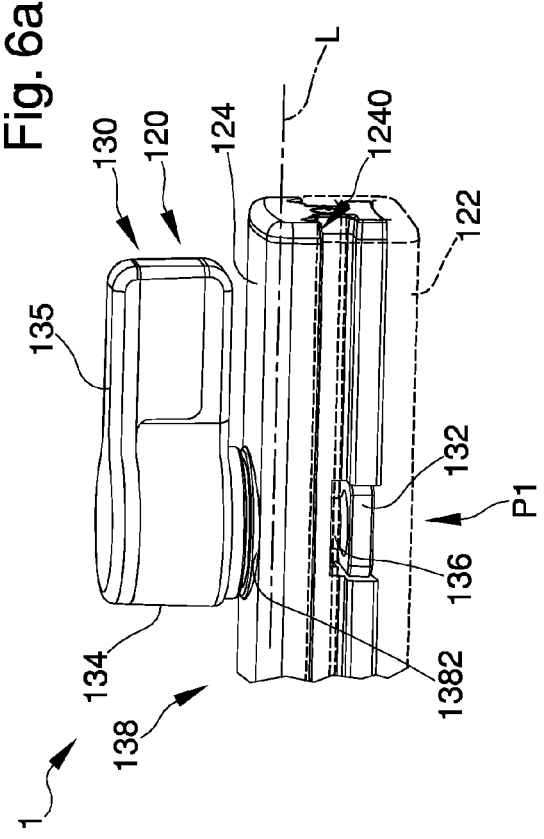
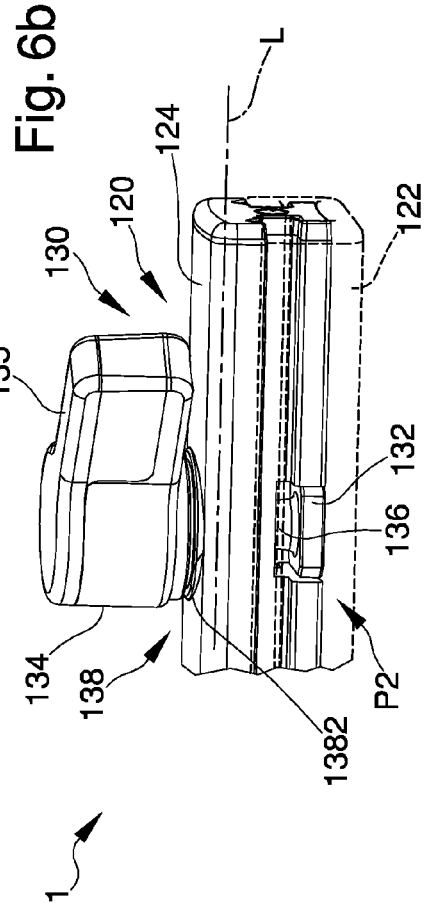
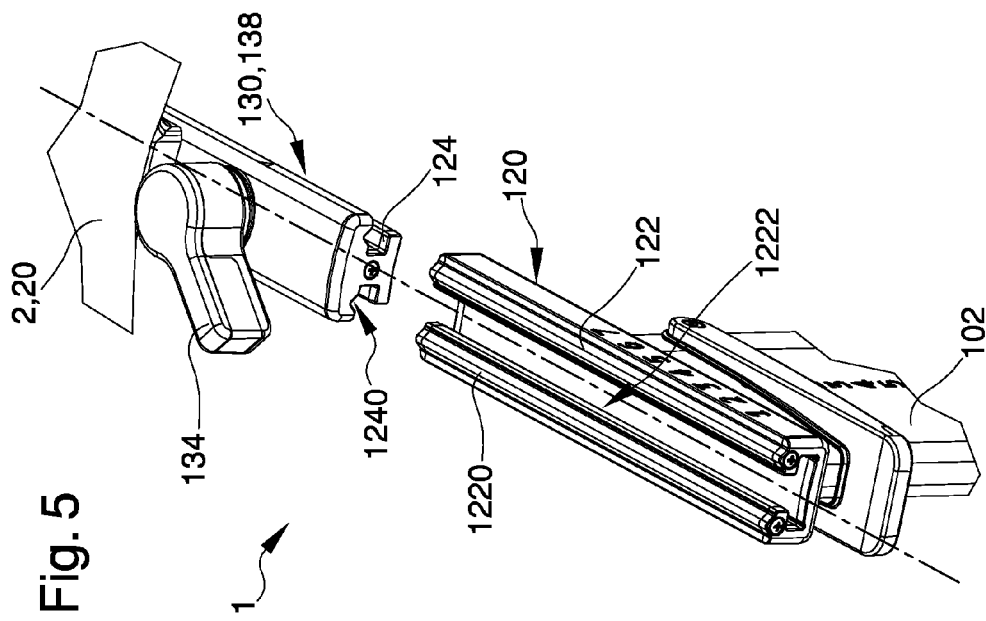

Fig. 7
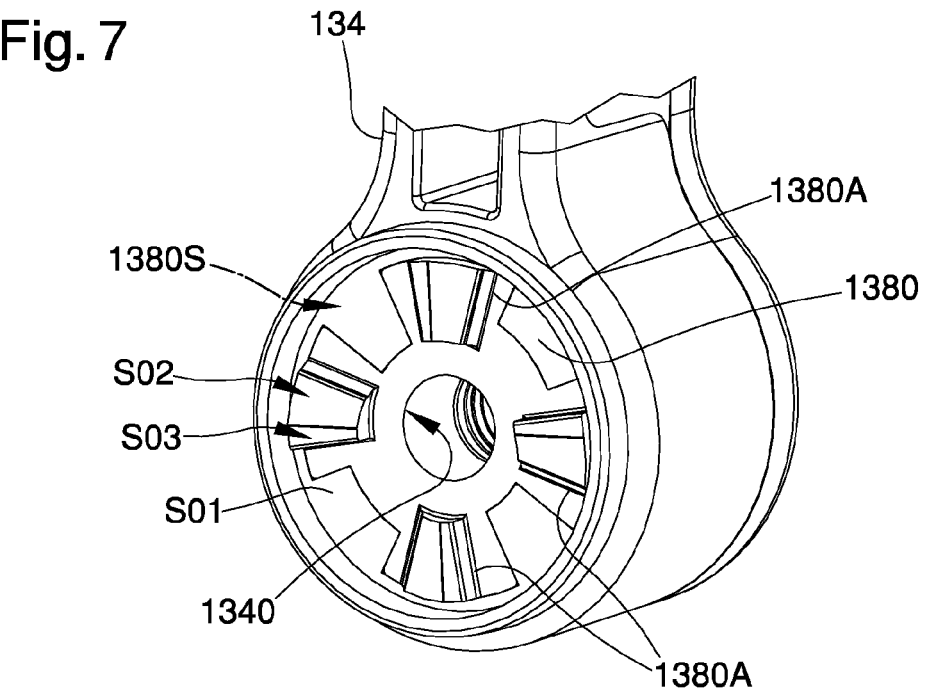
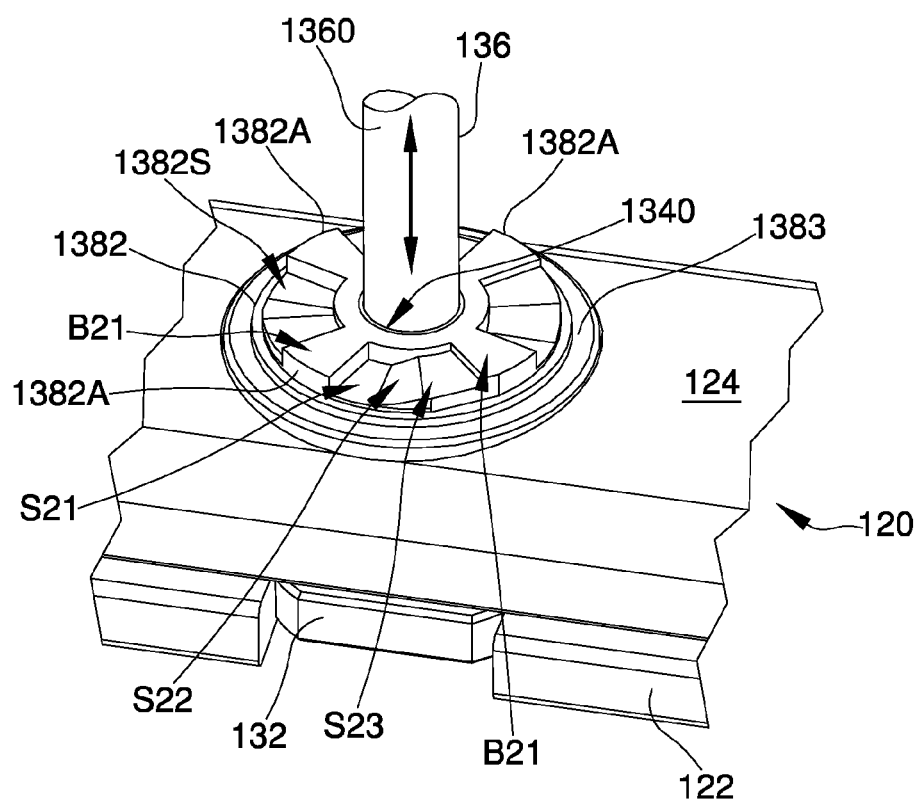

ADJUSTING GROUP

FIELD OF THE INVENTION

The present invention relates to an adjusting group. In particular, the present invention relates to an adjusting group that can be used to optimize the position of a user-interface of a gymnastic machine relative to a respective frame thereof. In greater detail, the present invention relates to an adjusting group that can be used to optimize the position of a user-interface of a gymnastic machine relative to a respective frame thereof according to the different modes of use of the machine.

BACKGROUND TO THE INVENTION

As it is well known in the field of gymnastic machines, abutments or, more generically speaking, user-interfaces are usually associated with the frame of these machines, whose purpose is to give the users a rest or support at given parts of the frame, in a completely safe and comfortable way. These user-interfaces are usually seats or rests for feet or hands. As regards a specific type of gymnastic machines, especially as regards stationary bikes, these interfaces are usually constituted by a saddle and a handlebar, with which a height adjusting device is usually associated. In some cases, especially in the case of stationary bikes for training in track or road cycling, wherein the tools used during a race are usually tailor-made for the specific user, the users can adapt the interface positions so as to reproduce the operating conditions under which they race. This is the case, for instance, of bikes for spinning, wherein saddles and handlebars can be adjusted in height and along the direction of elongation of the upper part of the body, i.e. horizontally or, with reference to the bike, longitudinally.

However, spinning is performed also by people who do not do cycling, and the various steps of the training, that is usually high-impact, are studied to involve more muscle regions in addition to those used to pedal. The aim is to maximize the training effectiveness and impact in the time of a training class. In this way, gyms provided with spinning bikes can maximize the profits made from this sport equipment, and can satisfy the needs of the more athletic users and/or of people who want to optimize the use of time. Currently, devices are known for adjusting the position of saddles and handlebars relative to the bike frame (or relative to the pivot axis of the pedals); these devices let the users adjust the saddle and pedals position only before starting the training, otherwise, if the user tries to do it while training, there is the risk to lose the balance and fall off. Or it is necessary to interrupt the training to adjust the position. The patent document CN102530164A discloses an example of these devices; however, it is clearly understood that, to actuate the screw blocking lever arranged on the front side, i.e. at a lower level than the handlebar, the training user shall get off to change the longitudinal position thereof. The same applies to the stationary bike "Tomahawk" model, produced by Matrix, wherein the slide carrying the saddle is longitudinally fastened to the guide through a screw driven into rotation by means of a crank arranged behind the saddle; the handlebar is connected to the frame in the same way, and both the guides for the saddle slide and the handlebar slide are integral with respective rods carried by the frame through the interposition of a substantially vertical sleeve, designed to adjust the height of the corresponding interface. In the case of the handlebar, the adjusting screw (and the corresponding crank) is arranged frontally and below the level of the handlebar. In view of the above description, the two cranks (of the saddle and the handlebar) allow to tighten the respective guides and slides through a circular movement by a multiple of 360°, for performing which the user shall be at the side, or at the back, of the bike for the necessary time, to prevent earphones cable from becoming entangled and clothes, worn or tied around the waist, from being caught up around the screw. Moreover, if the first adjustment is not optimal, the user should repeatedly stop the training session to change it. It should be noted that the user can identified the correct position of the interfaces relative to the frame only when he/she is on board and is pedalling; therefore, if the user identified an undesired position, he/she shall interrupt the training session to find the correct position, and this again and again, until he/she finds the optimal adjustment, maybe after a lot of attempts.

It should be also noted that the position of the cranks for adjusting the saddle and handlebar position are usually arranged in fixed position with respect to the frame, i.e. at always different distances from the interface whose position, relative to the frame, the user wants to adjust.

In view of the above description, and taking into account that a a spinning training session is comprised of steps, wherein the user pedals with or without resting the hands on the handlebar, and steps where the arms and the back are in particular positions; taking into account that in these bikes the gear is not free with the flywheel acting as rear wheel, and therefore the pedals movement shall be continuous and cannot be interrupted at will (for instance to rest with the feet on the pedals, or to change the bike settings without losing the balance), it is easily to understand that the devices for adjusting the position of the saddle and the handlebar do not meet the needs of the more athletic users in the spinning classes. It is therefore easily to understand that it would be useful to have available devices for adjusting the position of the saddle and/or the handlebar that can be used while performing the exercise, with some safe movements, without the risk for the user of losing the balance or the need to interrupt the training only to change the posture on the bike.

SUMMARY OF THE PRESENT INVENTION

The present invention relates to an adjusting group. In particular, the present invention relates to an adjusting group that can be used to optimize the position of a user-interface of a gymnastic machine relative to a respective frame thereof. In greater detail, the present invention relates to an adjusting group that can be used to customize the position of a user-interface of a gymnastic machine relative to a respective frame thereof according to the different modes of use of the machine.

An object of the present invention is to provide an adjusting group to regulate the position of a user-interface of a gymnastic machine relative to a respective frame thereof. According to the present invention an adjusting group is provided, whose main features will be described in at least one of the appended claims.

A further object of the present invention is to provide a bike equipped with said adjusting group to regulate the position of a user-interface of a gymnastic machine relative to a respective frame thereof.

According to the present invention a bike is provided, equipped with said adjusting group, whose main features will be described in at least one of the appended claims.

BRIEF DESCRIPTION OF DRAWINGS

Further characteristics and advantages of the adjusting group and the stationary bike equipped with this group according to the invention will be more apparent from the description below, set forth with reference to the attached drawings, that illustrate at least one non-limiting example of embodiment.

In particular:

FIG. 4 is a longitudinal cross-section of a detail visible in FIG. 2 and FIG. 3;

FIG. 5 is an exploded perspective view of FIG. 3;

FIGS. 6a and 6b are side elevation views of a first detail extracted from FIG. 2 (or FIG. 3) in two distinct operating configurations;

FIG. 7 is an exploded view, in enlarged scale and with some parts removed for the sake of clarity, of two components, shown coupled in FIGS. 6a and 6b;

FIG. 8 is a longitudinal cross-section of FIG. 2, with some parts removed for the sake of clarity.

DETAILED DESCRIPTION OF THE PRESENT INVENTION

Figure 1:
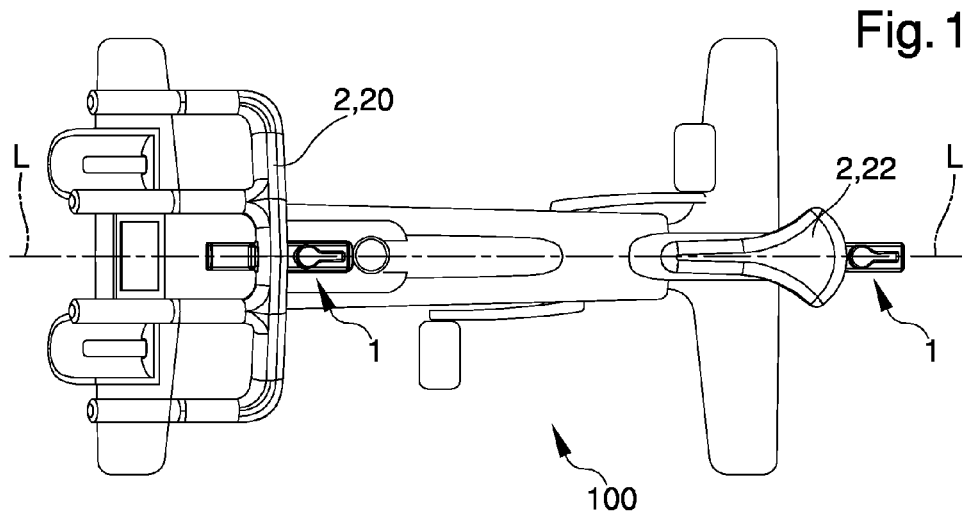
FIG. 1 is a plan view of an adjusting group according to the invention, with some parts removed for the sake of clarity.

In figures from 1 to 3, number 100 indicates a gymnastic machine provided with a frame 102 supporting a pair of user-interfaces 2 that can be used by a user to take position on the machine, adopting an adequate posture to perform a customized training session. An adjusting group 1 is associated with each user-interface 2, designed to adjust the longitudinal and vertical position of the corresponding user-interface 2 relative to the frame. Each adjusting group 1 comprises a sliding coupling unit 120, defining a substantially rectilinear first path L for adjusting the position of the respective user-interface 2 with respect to the frame 102. A first blocking device 130 is provided in combination with the coupling unit 120 to fix the corresponding user-interface 2 in any position along the first path (L). The coupling unit 120 comprises a guide 122 associated with the frame 102 and a slide 124 associated with the user-interface 2 and coupled to the guide 122 in sliding fashion along respective first coupling surface 1220 of the guide 122 and second coupling surface 1240 of the slide 124. Each first blocking device 130 is carried by the respective slide 124 to facilitate the adjustment of the position of the corresponding user-interface 2. As it is visible in FIG. 5, the guide 122 and the slide 124 may be built using portions of extruded bars of substantially conjugated shape, made of rigid resistant materials of limited density, such as aluminium or the like.

At this point, it should be noted that the gymnastic machine 100, with which at least one adjusting group 1 has been associated, is a stationary bike, of the type used for spinning or for performing exercises in training groups or classes, that will be indicated below with the same number 100, without however limiting the general scope of the invention. The bike 100 comprises two user-interfaces 2, in particular a saddle 22 and a handlebar 20; a respective adjusting group 1 is associated with each user-interface 2. In particular, the first blocking device 130 associated with the saddle 22 is arranged behind the saddle 22 according to the direction L, i.e. it is arranged, in use, behind the user, while the first blocking device 130 associated with the handlebar 20 is aligned with the direction L from the user's side, i.e. it can be accessed without interfering with the user's legs and always at the same distance from the corresponding user-interface 2 (handlebar 20 or saddle 22).

With particular reference to FIG. 4, the first blocking device 130 comprises a pin 136 arranged transversally to the first path L through the slide 124. The pin 136 has a body 1360 engaging a longitudinal groove 1222 (FIG. 5) provided in substantially central position in the guide 122; this body 1360 is delimited, at the side of the slide 124, by a threaded portion 1362, and engages the guide 122 with a respective end portion 132, shaped like a square plate. Essentially, this plate 132 is a blocking member 132 that may be rigidly fastened to the body 1360 (of the pin 136) or may be freely coupled to the body 1360. Due to the high simplicity of the application, in this case, not shown in the attached figures for the sake of drawing practicality, the body 1360 is shaped like a known flat-head screw; it is therefore provided with a head of greater dimension than that of the body 1360, whose aim is only to act as lower abutment suitable to axially hold a plate externally shaped like the plate 132 but equipped with a central hole allowing it to be axially coupled to the body 1360 of the pin 136 and to take an axially defined position, into tangential contact with the inner face of the screw head.

With particular reference to FIGS. 4 and 7 again, each first blocking device 130 furthermore comprises an actuating device provided with a pair with inclined plane, the actuating device and the pair being indicated, for the sake of practicality, with the same reference number 138. This pair 138 is provided with a first body 1380 and with a second body 1382, that extend peripherally around the respective pin 136. The first body 1380 is rigidly coupled to a handle 134 and has a hole 1340 engaged by the body 1360; the handle 134 has a cavity 1342 housing a nut 1344, with which the threaded portion 1362 is screwed. This cavity 1342 is closed by means of a lid 135, held in position by a screw member, shown in the drawing without reference number for the sake of drawing economy. The second body 1382 is rigidly connected to the slide 124. With particular reference to FIG. 4, the connection between the second body 1382 and the slide 124 is provided by means of a mechanical coupling 1383, i.e. a shape coupling between the second body 1382 and the slide 124, without however limiting the scope of the invention. With particular reference to FIG. 7, the first and the second bodies 1380 and 1382 face each other through respective first surface 1380S with inclined plane and second surface 1382S with inclined plane. This first surface 1380S and this second surface 1382S are shaped in a substantially conjugated fashion and are toothed, i.e. they have projections (or teeth) 1380A and 1382A, in equal number, extending vertically in FIG. 4.

In particular, with reference to FIG. 7, each tooth 1382A extends from a substantially horizontal plane S21 having an inclined portion S22 followed by a substantially horizontal flat portion S23 and by an angular abutment B21. Taking into account that, for the sake of practicality, the handle 134 has been illustrated vertical in FIG. 7, even if, in use, it is usually in substantially horizontal position, each tooth 1380A is shaped similarly to each tooth 1382A, but without the angular abutment provided in the corresponding tooth thereof, to avoid undesired interferences. The respective inclined portion S02 extends from an upper level than that of a respective plane S01, homologous to the plane S21, and ends in a flat portion S03. With reference to FIG. 4, it should be noted that the first teeth 1380A and the second teeth 1382A have increasing thickness according to given angles oriented in the same manner. In view of the above description, the particular conformation and number of the teeth 1380A and 1382A associate a vertical displacement of the first body 1380 relative to the second body 1382 with a relative angular rotation of the first and second bodies 1380 and 1382. In particular, in use, to an angular displacement (clockwise or counter-clockwise) of the first body 1380 corresponds a vertical movement of the first body 1380, and therefore of the slide 124, towards or away from the guide 122. Therefore, the particular conformation of the teeth 1380A and 1382A (of the first and second surfaces 1380S and 1382S) influences the entity of the coupling pressure of the slide 124 with respect to the guide 122.

It is easily understood that the vertical position of the pin 136 depends on the vertical position of the first body 1380 with respect to the second body 1382. On the other hand, the vertical position of the pin 136 is determined by the angular position of the first body 1380 with respect to the second body 1382, and thus by the angular position of the handle 134, and on this position depends the condition of coupling or free sliding of the slide 124 with respect to the guide 122.

With particular reference to FIGS. 6a and 6b, the clockwise rotation of the handle 134 causes the rotation of the first body 1380 on the second body 1382 and allows axially to switch the pin 136 (and therefore the plate 132) between a first stop operating position P1, wherein it keeps the first coupling surface 1220 and the second coupling surface 1240 into matching contact with each other and keeps the slide 124 firmly connected to the guide 122 and fixed relative to the frame 102 (position of the plate 132 shown in FIG. 6a), and a second releasing operating position P2, wherein it frees the first coupling surface 1220 and the second coupling surface 1240 from each other and makes the slide 124 free to slide relative to the guide 122, to find the correct adjusting position for the user-interface 2 relative to the frame 102 according to the user's current needs (position of the plate 132 shown in FIG. 6b). Obviously, the counter-clockwise rotation of the handle 134 causes the first body 1380 to raise with respect to the second body 1382 and the pin 136 to be positioned again in the respective position P2.

The actuating handle 134, centred on the pin 136, is therefore suitable to switch the plate 132 between the first operating position P1 and the second operating position P2 by means of rotations on a circle arc whose width is, with reference to FIG. 7 but without limiting the scope of the invention, lower than or equal to 90° in a given direction. Therefore, the direction of rotation to bring the pair 138 with inclined pair in the configuration of FIG. 6a or in the configuration of FIG. 6b is univocally identified. In this way, the reciprocal fastening of the slide 124 to the guide 122 is always determined, as well as the releasing thereof.

Figure 2:
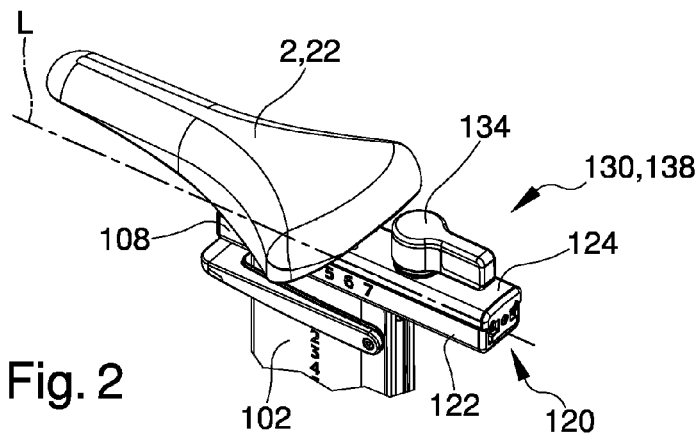
FIG. 2 is a schematic perspective view, in enlarged scale and with some parts removed for the sake of clarity, of a first portion of FIG. 1.
Figure 3:
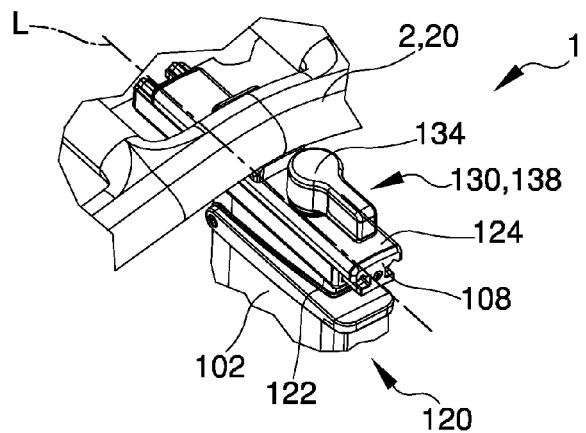
FIG. 3 is a schematic perspective view, in enlarged scale and with some parts removed for the sake of clarity, of a second portion of FIG. 1.
Figure 9:
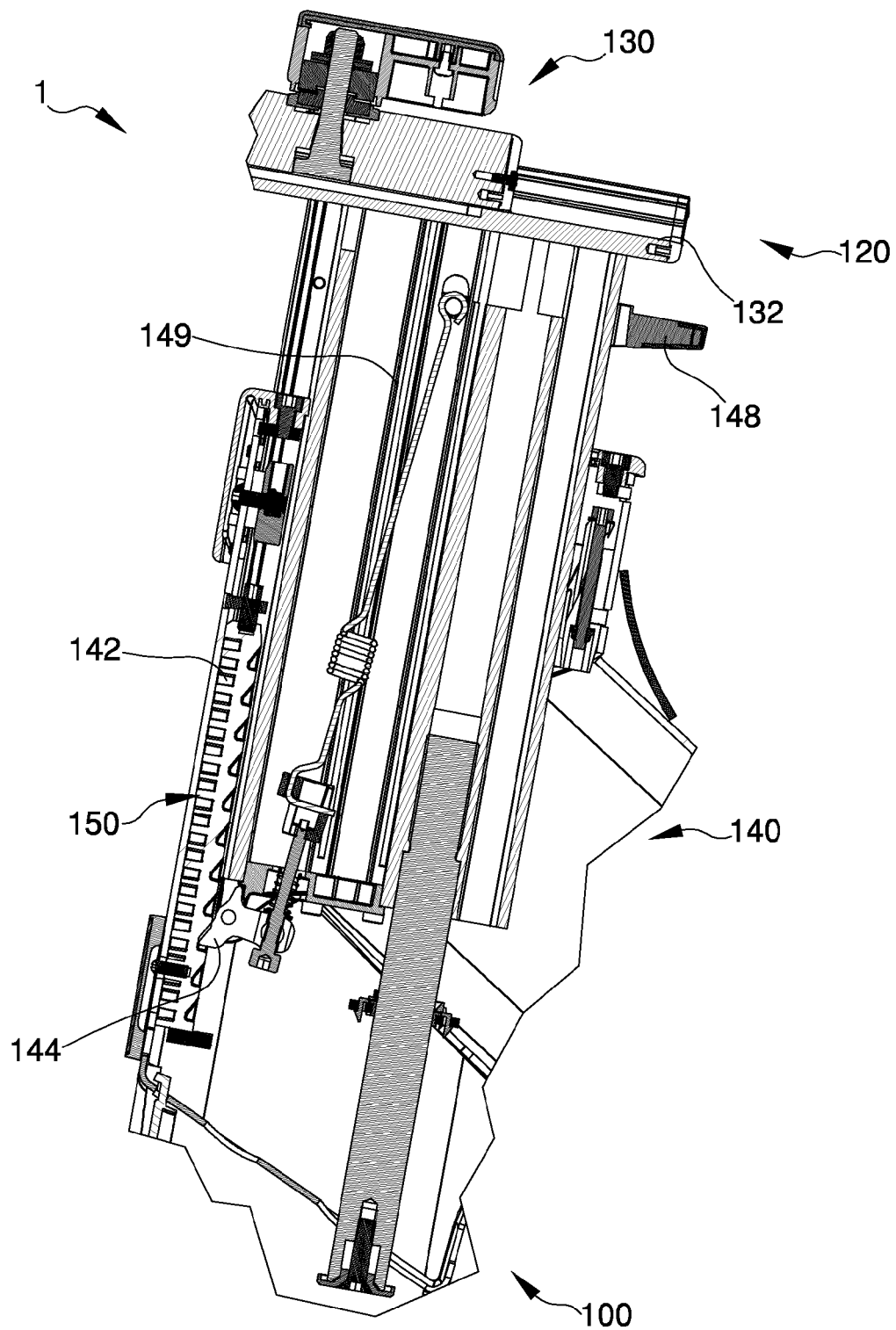
FIG. 9 is a longitudinal cross-section of FIG. 3, with some parts removed for the sake of clarity.

With particular reference to FIG. 2, the slide 124 carries the user-interface 2 and the actuating handle 134 adjacent to each other so that the handle 134 can be accessed from the top always at the same distance from the user-interface 2 with which it is associated. This allows the training user to act on the first blocking device 130 with only one hand, making always the same gesture with reference to a same adjusting member, and therefore to have always at least one hand resting on the handlebar 20. Moreover, the particular conformation of the first blocking device 130 allows the user to find the handle 134 always in the same given position behind the saddle 22 or behind the handlebar 20, independently of the position taken by these user-interfaces relative to the frame 102. It is easily understood that this feature allow to balance the user's posture during all the training steps, even if interspersed with steps where the positions of the user-interfaces 2 are changed so as to allow to take different postures, more suitable to the exercise to be performed.

Obviously, the scope of the present invention also comprises the case, not shown, wherein the second body 1382 is carried angularly movable with respect to the slide 124 through the handle 134, while the first body 1380 is held angularly fixed.

With particular reference to FIG. 8, the frame 102 comprises a sleeve 104 extending according to a first given direction D, substantially transversal to the path L, and housing, in an axially sliding fashion, an elongated member 106 delimited at the top by the guide 122. A second blocking device 140 is arranged between the elongated member 106 and the sleeve 104 to hold the guide 122 in a given position relative to the frame 102. In particular, the second blocking device 140 comprises a toothed rack 142, carried by the sleeve 104 in a rigid way, a toothed member 144, carried by the elongated member 106 in a tilting way, and a switching device 150 to switch the position of the toothed member 144 from an engaging position, wherein the toothed member 144 stably engages any space of the toothed rack 142, and a non-engaging position, wherein the toothed member 144 is arranged completely outside the spaces of the toothed rack 142.

It should be specified that the toothed rack 142 has respective spaces shaped like right-angled triangles, with the smaller leg facing the user-interface 2. In this way, in use, the toothed member 144 can freely slide on the profile of the toothed rack 142 to move the guide 122 upwards. The second blocking device 140 comprises an elastic return member 146 connected to the toothed member 144 to return the toothed member 144 from the non-engaging position to the engaging position of any of the spaces of the toothed rack 142, to allow the automatic engaging thereof. The switching device 150 comprises a handle 148 carried by the elongated member 106 at the side of the guide 122 and connected to the toothed member 144 by means of a rod 149.

The use of the adjusting group 1 and of the bike 100 comprising two adjusting groups, in combination, respectively, with the respective saddle 22 and the respective handlebar 20, is clearly apparent from the description above and does not require further explanation.

However, it could be useful to highlight that the features of the first blocking device 130 allow each adjusting group 1 to be actuated with only one hand, making always the same gesture with reference to an actuating member (the handle 134) arranged at constant distance from the user-interface (handlebar 20 or saddle 22), whose longitudinal position shall be adjusted while performing an exercise.

Lastly, it is clearly apparent that variants and modifications can be done to the adjusting group 1 and the bike 100 described and illustrated herein without however departing from the protective scope of the invention.

For instance, the blocking position of guide 122 and slide 124 can be also provided through a first surface 1380S and a second surface 1382S shaped in symmetric fashion (not shown), wherein the first tooth 1380' and the second tooth 1382' have a central cusp. In this way, the rotation for fastening the slide 124 to the guide 122 can be done in correspondence of the cusp, and thus on a circle arc of very reduced width and can be indifferently clockwise or counter-clockwise. Moreover, in this way the blocking position of the user-interfaces 2 can be "metastatic", as a minimal rotation of the actuating member 134 in one of the two directions would cause the undesired releasing of the slide 124 from the guide 122, with consequent releasing of the reciprocal coupling and loss of a fixed reference, thus of the balance, for the user.

In view of the above description, the bike 100 is provided with two adjusting groups 1, allowing to adjust the position of the respective user-interface 2 while continuing the training session. In fact, while being sitting on the saddle 22 and continuing pedalling, it is possible to grip one of the two handles of the handlebar 20 with one hand, and to use the other hand to release the corresponding slide 124 from the guide 122, acting on the corresponding blocking device 132. In particular, the handle 134 shall be rotated in a given direction (clockwise direction according to what shown in FIGS. 6a and 6b, to bring the plate 132 from the position P1 to the position P2). A this point, the handlebar 20 is free and can be moved forward or backward with the same hand that has actuated the handle 134, until it achieves the desired position, and can be easily fastened in the desired position by turning the handle 134 in opposite direction with respect to the previous direction (counter-clockwise, to bring the plate 132 from the position P2 to the position P1). For the adjustment of the saddle 22, remaining on the pedals it is possible to release with one hand the corresponding first blocking device 130, to use the same hand for changing the position of the saddle 22 and to use the same hand again to block the saddle 20 in the new position, analogously to what described above with reference to the handlebar 20.

The adjustment of the vertical position of the saddle 22 and of the handlebar 20 (user-interfaces 2) can be done by directly raising them (in view of the above description), if necessary by previously releasing the corresponding toothed member 144 through the respective handle 148, that keeps the toothed member 144 outside the spaces of the respective toothed rack 142 while moving the guide 122 upwards; on the contrary, due to safety reasons, the lowering of the saddle 22 and the handlebar 20 is possible only by acting on the handle 148, that allows also to adjust the position downward of the respective user-interface 2.

In view of the above description, it is easily understood that the adjusting groups 1 for adjusting the position of the saddle 22 and the handlebar 20 can be safely used while executing the exercise, without the risk for the user to lose the balance or to interfere with the exercise to change the posture on the bike, and they are therefore suitable to the needs of people performing challenging spinning exercises.

In this way, the bike 100 can be adapted to the user's sizes in a customized fashion also while performing an exercise during training.

In view of the above description it is clearly apparent that the adjusting group 1 can be used in association with a saddle or a handlebar of stationary bikes of any model, as well as of bicycles used for daily transport or of bicycles used for races, without departing from the protective scope of the present invention.

We claim:

1. An adjusting group for adjusting a position of a user-interface of a gymnastic machine relative to a respective frame thereof, comprising:
  a first sliding coupling unit being coupled to said user-interface to define a first path (L) for adjusting the position of said user-interface with respect to said frame;
  a first blocking device being provided in combination with said first sliding coupling unit to fix said user-interface in any position along said first path (L);
  wherein said first sliding coupling unit comprises a guide coupled to said frame and a slide coupled to said user-interface and said guide in a sliding fashion along respective first coupling surface and second coupling surface;
  wherein said first blocking device is carried by said slide;
  wherein said first blocking device comprises a blocking member arranged between said guide and said slide, movably carried transversally to said first path (L) between
  a first stop operating position (P1) in contact with said guide, wherein said blocking member keeps said first and second coupling surfaces into matching contact with each other and keeps said slide firmly connected to said guide and fixed relative to said frame, and
  a second releasing operating position (P2), wherein said blocking member frees said first and second coupling surfaces from each other and makes said slide free to slide relative to said guide, to find a correct adjusting position for said user-interface relative to said frame;
  wherein said first blocking device comprises a pin which carries said blocking member, is coupled to said first sliding coupling unit and is arranged transversally to said first path (L) through said guide to connect said slide and said guide rigidly;
  wherein said first blocking device comprises an actuating device adapted to influence a position of said pin transversally to said slide in order to switch an axial position thereof between the first and the second operating positions (P1, P2), and an actuating member coupled to said pin to move said pin axially;
  wherein said actuating device comprises a first body coupled to said slide in an angularly movable manner, and a second body facing said first body and carried integrally by said slide; said first and second bodies having respective first and second surfaces each having an inclined plane designed to be conjugated together so that, in use, an angular displacement of said first body relative to said second body corresponds to a change in the axial position of said pin to switch said blocking member between said first and second operating positions (P1, P2).

2. An adjusting group according to claim 1, wherein said first blocking device is carried by said slide at a constant distance from said user-interface.

3. An adjusting group according to claim 1, wherein each of said first and second surfaces that each have the inclined plane extends peripherally around said pin so that said actuating member is able to switch said blocking member between said first and second operating positions (P1, P2) by rotating on a circle arc of a given width.

4. An adjusting group according to claim 1, wherein said slide carries said user-interface and said actuating member adjacent to each other so that said actuating member can be accessed from a top of the slide and adjacent to a side of said user-interface.

5. An adjusting group according to claim 1, wherein said first path is rectilinear and wherein said adjusting group further comprises
  a sleeve coupled to said frame and extending according to a first given direction; (D); wherein said sleeve houses, in an axially sliding fashion, an elongated member having a top connected to said guide;
  a second blocking device being arranged between said elongated member and said sleeve to hold said guide in a given position relative to said frame;
  wherein said second blocking device comprises a tooth rack, carried by said sleeve in a rigid way, a toothed member, carried by said elongated member in a tilting way, and a switching device to switch the position of said toothed member from an engaging position, wherein said toothed member stably engages any space of said toothed rack and a non-engaging position, wherein said toothed member is arranged completely outside said toothed rack.

6. An adjusting group according to claim 5, wherein said toothed rack has respective spaces shaped as right-angled triangles a smaller leg facing said user-interface, in order to allow said toothed member to slide freely, in use, on a profile of said toothed rack to move said guide upwards;
wherein said second blocking device comprises an elastic return member connected to said toothed member to return said toothed member from said non-engaging position to said engaging position of any of said spaces to allow automatic engaging of said toothed rack;
wherein said switching device comprises a handle carried by said elongated member at a side of said guide and connected to said toothed member by a rod.

7. An adjusting group according to claim 1, wherein said user-interface comprises a handlebar or a saddle.

8. A bicycle comprising a first adjusting group as described in claim 1, whose user-interface is constituted by a saddle or by a handlebar.

9. A method for adjusting a position of a user-interface of a gymnastic machine relative to a respective frame thereof; said method comprising:
(a) providing an adjusting group for adjusting the position of a user-interface of a gymnastic machine relative to a respective frame thereof, comprising:
a first sliding coupling unit being coupled to said user-interface to define a first path (L) for adjusting the position of said user-interface with respect to said frame;
a first blocking device being provided in combination with said first sliding coupling unit to fix said user-interface in any position along said first path (L);
wherein said first sliding coupling unit comprises a guide coupled to said frame and a slide coupled to said user-interface and said guide in a sliding fashion along respective first coupling surface and second coupling surface;
wherein said first blocking device is carried by said slide;
wherein said first blocking device comprises a blocking member arranged between said guide and said slide, movably carried transversally to said first path (L) between
a first stop operating position (P1) in contact with said guide, wherein said blocking member keeps said first and second coupling surfaces into matching contact with each other and keeps said slide firmly connected to said guide and fixed relative to said frame, and
a second releasing operating position (P2), wherein said blocking member frees said first and second coupling surfaces from each other and makes said slide free to slide relative to said guide, to find a correct adjusting position for said user-interface relative to said frame;
wherein said first blocking device comprises a pin which carries said blocking member, is coupled to said first sliding coupling unit and is arranged transversally to said first path (L) through said guide to connect said slide and said guide rigidly;
wherein said first blocking device comprises an actuating device adapted to influence a position of said pin transversally to said slide in order to switch an axial position thereof between the first and the second operating positions (P1, P2), and an actuating member coupled to said pin to move said pin axially;
wherein said actuating device comprises a first body coupled to said slide in an angularly movable manner, and a second body facing said first body and carried integrally by said slide; said first and second bodies having respective first and second surfaces each having an inclined plane designed to be conjugated together so that, in use, an angular displacement of said first body relative to said second body corresponds to a change in the axial position of said pin to switch said blocking member between said first and second operating positions (P1, P2);
(b) defining a position of said user-interface relative to said frame along a first adjusting path (L) by said first sliding coupling unit;
(c) fixing said user-interface in any position along said first path (L) by said first blocking device to interact with said first sliding coupling unit;
(d) providing said first coupling unit with said guide coupled to said frame and said slide coupled to said user-interface; and
(e) keeping said first blocking device on said slide at a constant distance from the corresponding user-interface.

10. A method according to claim 9, wherein the step of keeping said first blocking device on said slide at a constant distance from the corresponding user-interface is accomplished by a rigid connection between said user-interface and said first blocking device.

* * * * *